United States Patent [19]

Whitaker

[11] Patent Number: 4,950,752

[45] Date of Patent: Aug. 21, 1990

[54] EXPRESSION METHOD

[75] Inventor: R. John Whitaker, Cornwall RR2, Canada

[73] Assignee: Carratech, Inc., Charlottetown, Canada

[21] Appl. No.: 86,961

[22] Filed: Aug. 19, 1987

[51] Int. Cl.$^5$ .................. C08B 37/00; C07H 1/06
[52] U.S. Cl. .................. 536/128; 536/127; 536/114; 127/43; 210/767; 210/808
[58] Field of Search .............. 536/114, 128, 127; 260/705; 127/43; 210/767, 808

[56] References Cited

U.S. PATENT DOCUMENTS

| 772,472 | 10/1904 | Neill | 100/118 |
|---|---|---|---|
| 3,094,517 | 6/1963 | Stanley | 536/122 |
| 3,176,003 | 3/1965 | Stancioff | 536/122 |
| 3,236,833 | 2/1966 | Gordon et al. | 536/114 |
| 3,476,741 | 11/1969 | Jonas | 536/114 |
| 3,872,695 | 3/1975 | Busek | 69/47 |
| 3,907,770 | 9/1975 | Strong | 536/114 |
| 4,033,253 | 7/1977 | Stollenwerk | 100/118 |
| 4,153,550 | 5/1979 | Lautrette | 210/770 |
| 4,181,796 | 1/1980 | Dietrichs et al. | 536/1.1 |
| 4,547,226 | 10/1985 | Milch et al. | 127/41 |
| 4,586,430 | 5/1986 | Tichy | 100/118 |
| 4,589,923 | 5/1986 | Gruenewald | 127/4 |
| 4,788,910 | 12/1988 | Tichy et al. | 100/120 |
| 4,816,573 | 3/1989 | Whitaker | 536/128 |

FOREIGN PATENT DOCUMENTS

| 0980261 | 12/1975 | Canada | 536/128 |
|---|---|---|---|
| 1273467 | 9/1960 | France | 536/128 |
| 45-11510 | 4/1970 | Japan | 536/128 |
| 45-37777 | 11/1970 | Japan | 536/128 |
| 59-159299 | 9/1984 | Japan . | |
| 59-163099 | 9/1984 | Japan . | |
| 60-69102 | 4/1985 | Japan | 536/128 |
| 1247070 | 9/1971 | United Kingdom . | |
| 1398213 | 6/1975 | United Kingdom . | |
| 1457345 | 12/1976 | United Kingdom . | |
| 1508490 | 4/1978 | United Kingdom . | |
| 2001544A | 2/1979 | United Kingdom . | |

OTHER PUBLICATIONS

Kloss; *Back to Eden*, pp. 82–83, (1939), Back to Eden Books ® Publishing Co.; CA, U.S.A.
Lust; *The Herb Book*, pp. 36–37 (1974), Benedict Lust Publications; N.Y. U.S.A.
Back; *The Illustrated Herbal*, pp. 13–16 (1987), Crescent Books; N.Y., U.S.A.

*Primary Examiner*—Ronald W. Griffin
*Assistant Examiner*—Nancy S. Carson
*Attorney, Agent, or Firm*—Fish & Richardson

[57] ABSTRACT

A method is provided for obtaining concentrated solutions of mucilaginous material by heating plants in an aqueous alkaline medium to form a mixture of solid and liquid, then rapidly expressing the liquid from a thin layer of plant in the apparatus. Apparatus for successively expressing liquid from batches of liquid-solid mixture, said apparatus including a porous septum at the open face of a chamber, the chamber being intermittently sealed to the septum, and having a piston to press the mixture against the septum to express liquid through the septum, the solid residue from each batch being conveyed beyond the unsealed chamber as the next batch is being conveyed into it.

4 Claims, 2 Drawing Sheets

EXPRESSION METHOD

This invention relates to a method of extracting soluble components from plants, particularly from sea plants, and to expression apparatus particularly useful, inter alia, for carrying out such method.

It has hitherto been proposed to extract soluble components such as mucilaginous materials, e.g. carrageenan, agar, furcellaran, and the like from a variety of plants, particularly sea plants, by heating the plants in an excess of aqueous alkaline solution, then filtering, as described for example in U.S. Pat. Nos. Stanley 3,094,517, Stancioff 3,176,003, Gordon et al. 3,236,833, Jonas 3,476,741 and Strong 3,907,770. In such processes, a large excess of liquid is employed, and/or degradation of the mucilaginous component is effected. Consequently, the desired product can be obtained, whether degraded or in substantially undegraded form i.e. with minimal degradation, only after removal of a large quantity of liquid from the dilute filtered solution. The removal of the excess liquid, for example, water, adds greatly to the cost of the product as well as to the time required to carry out the process.

It has also been proposed to express liquid from solid-liquid mixtures by subjecting the mixture to pressure against a screen or septum, as in a cider press, for example. Equipment for performing expression operations ranges from the simple low cost batch presses of the box, platen, pot, curb and cage types to sophisticated continuous screw presses, roller mills, and belt presses. While continuous expression equipment is advantageous from the aspect of labor saving, it is not normally applicable to solid-liquid mixtures possessing low internal strength, since these tend to be squeezed away from the compressinq walls or members and beyond their margins instead of through the porous septum. It has also been proposed to overcome this problem by adding to the mixture press aids in the form of wood fibers, rice husks, and the like, which adds to the overall cost of the operation and requires disposal of the waste press aid. In addition, continuous presses, and in particular, belt presses, produce expressates which contain substantial proportions of solids and are therefore of reduced purity.

Batch type expression apparatus, using the approach generally known as confined expression, can be utilized for liquid-solid mixtures possessing low internal tensile strength but suffers from the disadvantage of being labor intensive. Consequently, in practice, it has been customary to dilute with excess water the viscous pasty liquid-solid mixtures obtained by heating in aqueous alkaline solution those plants containing soluble mucilaginous components, particularly sea plants containing carrageenan, before separating the liquid from the solid. The dilution makes it possible to separate the liquid by conventional filtration equipment, but increases greatly the amount of liquid which must be removed to obtain a dry product.

By employing the present invention, it is possible to achieve rapid separation of liquid from liquid-solid mixtures in which the weight ratio of liquid to solid is no greater than 6:1 and in which the concentration of mucilage, e.g. carrageenan, agar, etc. is greater than 3% by weight, preferably from 3% to 10% by weight.

The present invention provides a method for achieving a high rate of expression of liquids from liquid-solid mixtures, particularly those having low concentrations of liquid, at reduced labor costs, and at the same time reducing or eliminating the need for adding press aids to mixtures having low internal tensile strength. As is well known, the average rate of expression from a liquid-solid mixture can be increased by increasing the pressure applied or by decreasing the thickness of the layer of liquid solid mixture on the septum. The effect of increasing the pressure falls off rapidly as the pressure is increased and there is little advantage in utilizing expression pressures in the method of the present invention greater than about 4.2 MPa. The thickness of the layer pressable on each stroke of the machine is dependent on the material being pressed, the nature of the cake produced, and the pressure utilized. When the solids comprising the cake are compressible (as in most cases involving expression), the effect of increasing pressure is not linear in its effect on average expression rate, and there is little benefit in increasing the pressure infinitely. Such a large expression rate per unit area can be achieved with thin layers that there appears little advantage in utilizing pressures within the expression chamber of greater than 4.2 MPa, although this is by no means limiting. For example, utilizing this pressure while pressing lambda carrageenan bearinq pastes, with actual expressate viscosities of greater than 100,000 centipoise, final cake thicknesses of 0.3 mm are utilized, and expression rates of 1 kg/sec per square meter of filter septum (in terms of expressate) can be realized during pressurization. The time period during which actual pressurization of the chamber is continued during each cycle of operation may be as short as 0.05 second and need not exceed about 0.5 second. There is little advantage in most cases of utilizing longer actual pressure times than this, although each case would need to be evaluated to optimize overall throughput rates.

Consequently, in one aspect, the present invention features expressing from a mass of plants such as sea plants containing in aqueous solution at least one solubilized component which comprises subjecting a layer of said plants on a porous septum to a pressure of at least 2 MPa aqainst said septum for a period of time for about 0.05 to 0.5 second to exude said solution through said septum and leave a deposit of plant residue on said septum, the thickness of said deposit being from about 0.3 to 2 mm. Such a process results, without the addition of press aid or solid filler, in expression of an amount of liquid solution which is at least 80% by weight of the mass of plants being processed, a very satisfactory result, particularly in the case of lambda carrageenan solution expressed from alkali-treated sea plants.

The invention also comprises apparatus for expression of liquid from a mixture of solid and liquid, the apparatus comprising a porous septum for supporting a layer of the mixture to be expressed, a chamber having an open face adjacent the septum and means for sealing and unsealing the open face to the septum, means for pressing said layer of mixture against said septum within said chamber while sealed to the septum to express liquid from the mixture through the septum, and means for withdrawing the septum from the face of the chamber while the chamber is unsealed to remove successive portions of the solid fraction of the layer of mixture from the chamber after expression of liquid. The invention also comprises a method of extracting soluble components, preferably in substantially undegraded form, from plants by heating the plants in contact with an aqueous alkaline medium to dissolve the components and form a mixture of liquid and solid, depositing successive spaced apart batches of the mixture on a porous septum, successively pressing each batch against the septum to express the liquid through the septum while retaining the residue of the solid on the septum, and removing each batch of residue from the septum.

The septum employed in the present invention is one which does not blind, that is, become plugged with solid material, during extended use. Conventional heavyweight woven fabrics and felts made with multifilament spun staple yarn tend to blind very quickly and require excessive washing to restore their permeability, leading to loss of product. Best results are obtained by using as the septum thin screens woven from monofilaments of nylon or polyester in a twill weave and having a nominal pore or aperture diameter from 0.6 to 6 micrometers and filament diameters from 20 to 50 micrometers. Suitable septa having the specified characteristics are commercially available. The use of such a septum makes it possible to separate the residual solids from the septum after expression of liquid simply by scraping; little or no washing is required to restore permeability. Liquids such as aqueous mucilage solutions having a viscosity greater than 1000 cp. can be readily separated from solid plant residues using such a septum.

Figure 1:
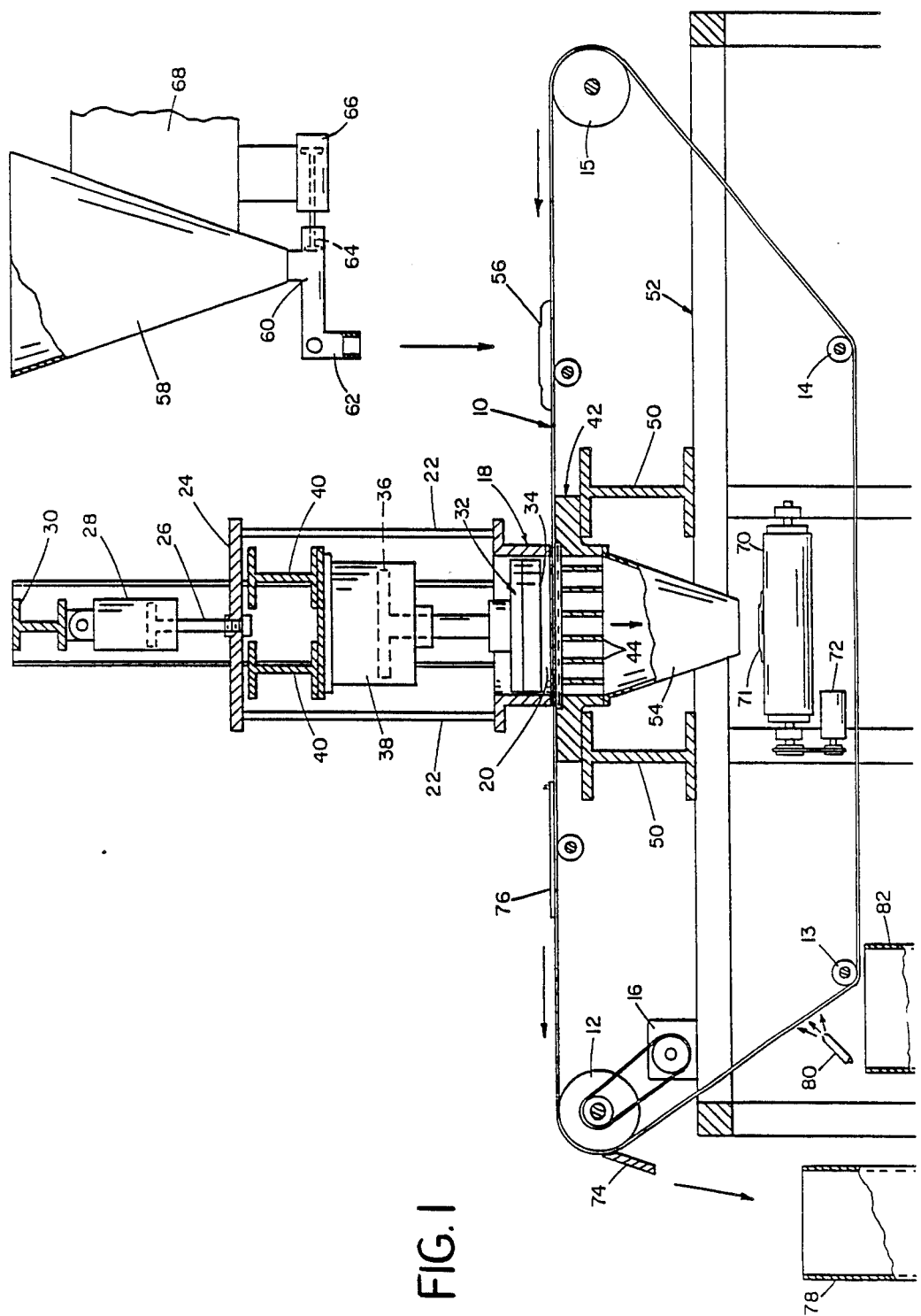
FIG. 1 is view in side elevation partly broken away in section showing one embodiment of the apparatus of the present invention.

As shown in the drawings, the embodiment of FIG. 1 includes a porous septum 10 in the form of a continuous belt trained about pulleys 12,13,14,15 and advanced intermittently in the direction shown by the arrows by means of belt and motor drive 16. Mounted above belt 10 is a cylinder 18 having an open lower face which forms with the septum a chamber 20. Cylinder 18 is supported by tie rods 22,22 secured to support member 24 which in turn is mounted on piston 26 slidably mounted within hydraulic cylinder 28 which is supported by I-beam 30. Hydraulic fluid is supplied to and withdrawn from cylinder 28 by suitable means (not shown) so that piston 26 and consequently cylinder 18 can be moved upwardly and downwardly so as to press the lower margin of cylinder 18 against septum 10 in sealing relation thereto.

Disposed within cylinder 18 is means for pressurizing chamber 20 in the form of piston 32 having an imperforate flat lower face 34. Piston 32 is supported by actuating piston 36 reciprocally mounted in a second hydraulic cylinder 38, the latter being supported independently by I-beams 40,40 and being provided with means (not shown) for introducing and withdrawing hydraulic fluid so as to actuate piston 36 and drive piston 32 so as to pressurize or depressurize chamber 20. Mounted beneath septum 10 and cylinder 18 is a pervious anvil 42 including a plurality of spaced apart supporting bars 44,44 directly beneath the open face of cylinder 18.

Mounted on these bars (FIGS. 2,3) is a perforated metal screen 46 and above that, immediately beneath septum 10 a fine wire mesh screen 48. Anvil 42 is rigidly supported on I-beams 50,50 which in turn are carried by supporting frame 52. Depending from the bottom of anvil 20 is funnel 54.

Mounted above septum 10 adjacent to cylinder 18 is a feed means for depositing successive batches 56 of liquid solid mixture on the face of septum 10 before it advances beneath the open face of cylinder 18. The feed means includes a hopper 58 together with its depending batch-measuring chamber 60 and delivery nozzle 62, and a delivery piston 64 actuated by hydraulic drive piston and cylinder 66, all mounted on supporting frame 68. Hydraulic cylinder 66, like cylinders 28 and 38, is provided with a hydraulic fluid supply system (not shown) for delivering measured batches of the liquid solid mixture from hopper 58 at timed intervals. The hydraulic control systems for cylinders 28,38 and 66 and motor drive 16 for septum 10 are coordinated by conventional means for operation in the desired sequence as will be explained below.

Beneath the lower open end of funnel 54 is mounted a conveyor belt 70 driven by a conventional belt-motor drive 72.

Scraper 74 is mounted adjacent the downwardly extending portion of septum 10 to removes from it batches of solid residues 76 carried by the septum as it emerges from beneath cylinder 18, and receptacle 78 serves to collect the solid residue. Spray nozzle 80 is also mounted adjacent septum 10 beneath scraper 74 to wash the septum free of any adherent solid residue, the washings being collected in receptacle 82.

In operation of the embodiment shown in FIG. 1, the feed mechanism is actuated to deposit a measured batch of liquid-solid material from measuring chamber 60 onto the surface of septum 10 either while septum 10 is stationary or while it is advancing. In order to permit the septum 10 to be advanced, piston 26 and piston 36 in their respective hydraulic chambers are both actuated to withdraw cylinder 18 from septum 10, thus unsealing chamber 20 and also to withdraw piston 32, thus depressurizing chamber 20. The advancing septum then carries batch 56 to a position within the lower margin of cylinder 18, whereupon the septum is stopped, piston 26 is actuated to force the lower margin of cylinder 18 aqainst septum 10 around batch 56, thus sealing the open face of cylinder 18 to the septum, which is supported from beneath by anvil 42 and screens 46,48. The pressure between the lower margin of cylinder 18 and the septum 10 must be higher, preferably at least 0.6 MPa higher, than that of the pressure subsequently applied to batch 56 within chamber 20 in order to maintain the desired seal. The narrow width of the lower margin of cylinder 18 facilitates generation of high pressure between it and septum 10 aqainst anvil 42 Piston 36 is then actuated to move piston 32 downwardly, pressurizing chamber 20 and squeezing batch 56 aqainst septum 10 to express the liquid through the latter and into funnel 54 from whence it is directed onto the surface of conveyor belt 70. The liquid 71, being highly viscous in nature, remains puddled near the center of the surface of belt 70 and is carried by the latter to a delivery station for further processing.

Upon completion of the expression step, piston 32 is raised to depressurize chamber 20 and cylinder 18 is moved to the raised position to unseal its lower margin from septum 10. Septum 10 is then advanced to the left as shown in FIG. 1 carrying on its surface the residual solids of batch 56. Simultaneously the next successive batch 56 is introduced into chamber 20 within the lower margin of cylinder 18, and the cycle is repeated. When each successive batch of solid residue 76 reaches scraper 74, it is scraped off and falls into receptacle 78 from the surface of the septum, which is subsequently rinsed or washed by spray from nozzle 80. As shown in this embodiment, the septum 10 is a continuous band and is reused repeatedly for successive batches.

Figure 2:
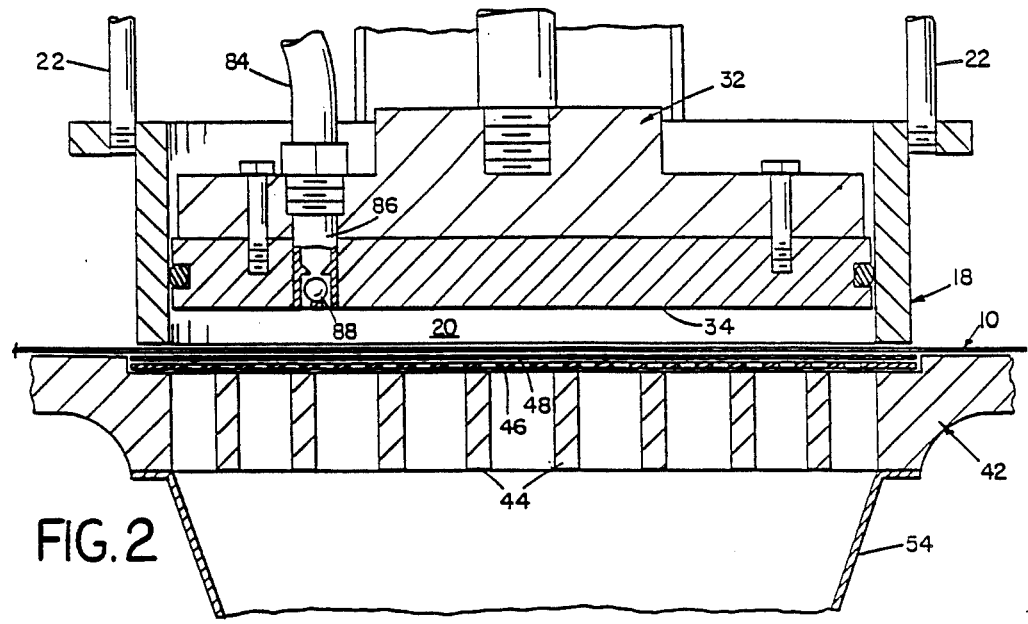
FIG. 2 is a view on an enlarged scale and in section of a portion of the apparatus showing a second embodiment.

A second embodiment is shown in FIG. 2 of the drawing in which the parts in general correspond to those in FIG. 1. It differs from the embodiment of FIG. 1 in that piston 32 is provided with an inlet tube or hose 84 connected to a passageway 86 extending vertically through the piston and opening at its bottom face 34 into chamber 20. The lower outlet of passage 86 is provided with a ball check valve 88 serving to permit flow downwardly through passage 86 but preventing flow in the opposite direction. The free upper end of tube 84 is connected to nozzle 62 of a feeding mechanism such as the one shown in FIG. 1. In this embodiment the timing of the several drive devices is adjusted so that a fresh batch of liquid solid mixture is introduced into space 20 through passageway 86 after cylinder 18 has been sealed to septum 10 and before piston 32 has been actuated to pressurize chamber 20.

Figure 3:
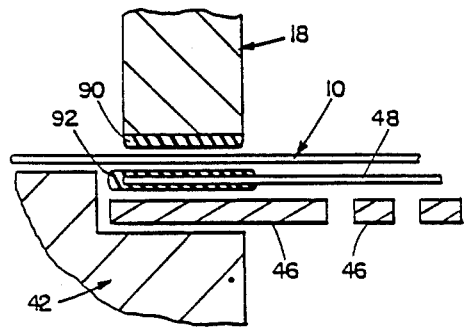
FIG. 3 is a view in section partly broken away showing one embodiment of the chamber seal.
Figure 4:
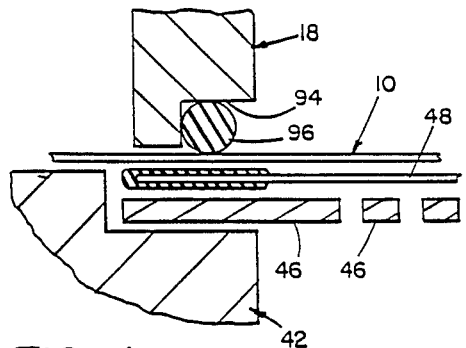
FIG. 4 is a view in section partly broken away showing a second form of chamber seal.
Figure 5:
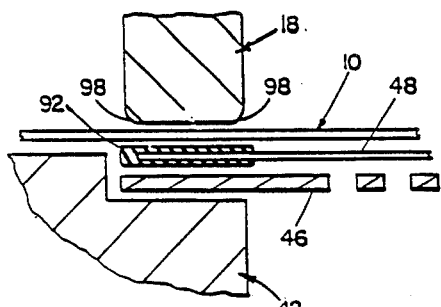
FIG. 5 is a view in section partly broken away showing a third form of chamber seal; and, FIG. 6 is a view in section partly broken away showing still another form of seal used in the present invention.

In FIGS. 3–5 of the drawing are illustrated alternative constructions for the lower margin of cylinder 18 and of anvil 42 together with its supporting screens. In the structure of FIG. 3 the lower margin of cylinder 18 is provided with a compressible elastomeric facing 90, and the margin of wire mesh screen 48 is also provided with a compressible elastic covering 92 opposing facing 90. When cylinder 18 is pressed aqainst anvil 42 the elastomeric elements 90,92 serve to seal the margin of cylinder 18 against septum 10. In FIG. 4, there is shown another construction in which the lower inner margin of cylinder 18 is rabbeted at 94 to receive an elastomeric O-ring 96 instead of facing 90, the construction otherwise being the same as that shown in FIG. 3.

Figure 6:
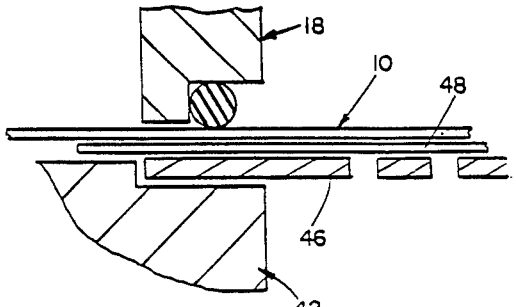
Figure 7:
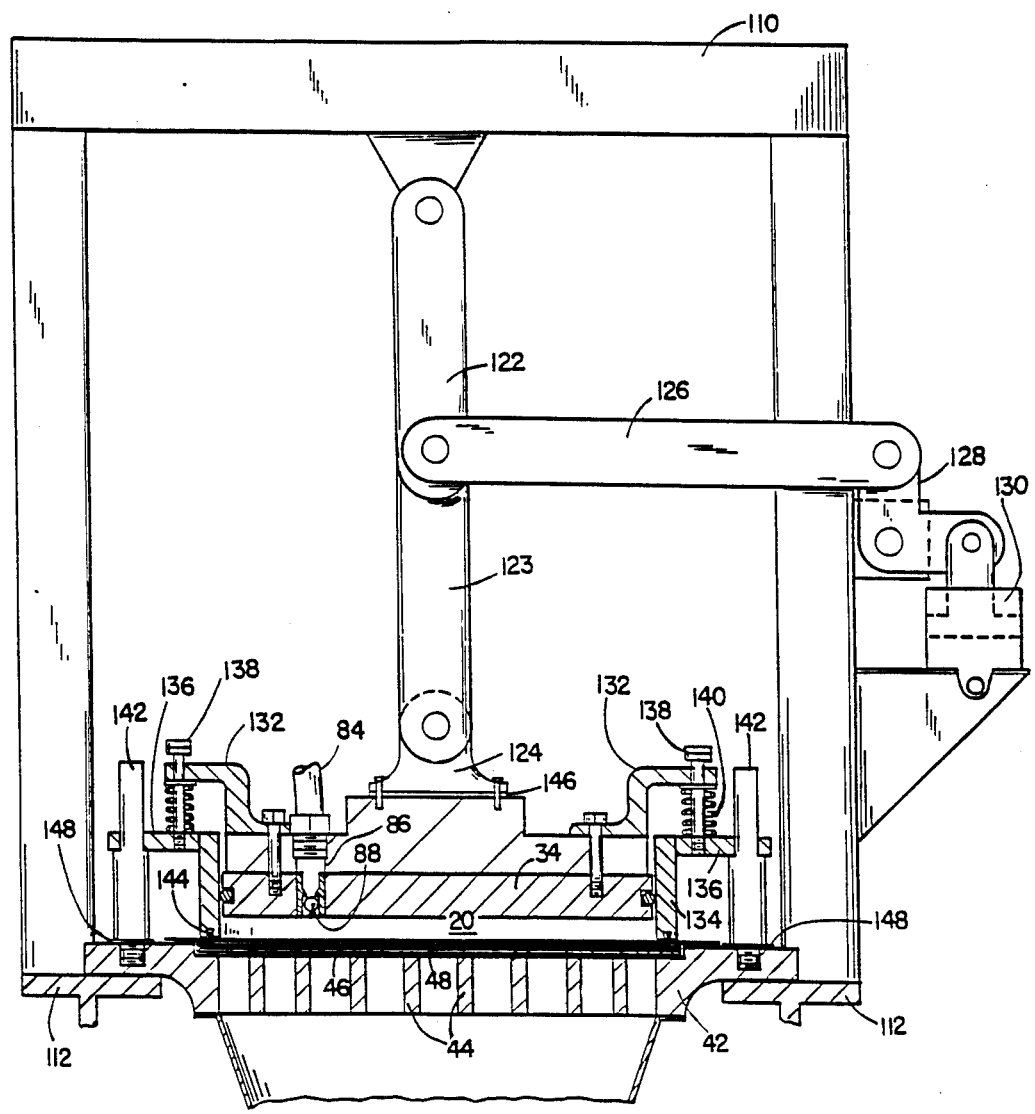

In FIG. 5 is illustrated a further construction in which the inner and outer edges 98,98 of the lower margin of cylinder 18 are chamfered or rounded and facing 90 is omitted, the seal being achieved by pressure against elastomeric covering 92 on wire mesh screen 48. There is illustrated in FIG. 6 still another construction which is the same as that of FIG. 4 except that the rubber covering on the margin of wire mesh screen 48 has been omitted, the seal being achieved by compression of O-ring 96 aqainst the top face of the septum. By appropriate selection of the drive components, an overall cycle time of less than 3 seconds can be readily achieved, and an overall hourly expression rate of 1200 kg/hr per square meter of filter septum can be realized in the example of thick viscous aqueous lambda carrageenan liquid. With a 4% carrageenan content, this is an eventual yield of equivalent dry lambda carrageenan of 48 kg/hr per square meter. In the lambda carrageenan example, to achieve this average throughput rate in conventional equipment (e.g. plate and frame filter presses) would require dilution of the input material with water such that its lambda carrageenan content was around 0.5% by weight to reduce the viscosity to around 500 cPs, and would require a filtration surface of 200 square meters. Moreover, substantial additions of a filter aid would be required, to prevent filter cloth blinding.

What is claimed is:

1. Method of separating components from sea plants containing carrageenan which comprises heating said plants in contact with an aqueous alkaline medium to dissolve components of said plants soluble in said medium and to form a mixture of liquid and solid, intermittently advancing a porous septum through a deposition station and an expression station, depositing successive spaced apart batches of said mixture on said septum at said deposition station, enclosing each said batch within a chamber at said expression chamber by pressing the margin of an open-faced chamber against said septum around said batch, and successively pressing each said batch against said septum within said chamber at said expression station at a pressure of at least 2 MPa for 0.05 to 0.5 second while maintaining a pressure between said margin and said septum at least 0.6 MPa greater than the pressure against said batch to express said liquid through said septum while retaining residual plant solid on said septum, said expressed liquid containing at least 3% by weight of carrageenan.

2. Method as claimed in claim 1 in which said septum is in the form of an endless band and said method comprises the additional step of removing said residual plant solid from said septum after expression of said liquid before reaching said deposition station.

3. Method of separating components from sea plants containing carrageenan which comprises heating said plants in contact with an aqueous alkaline medium to dissolve components of said plants soluble in said medium and to form a mixture of liquid and solid, intermittently advancing a porous septum through an expression station, forming an enclosed chamber at said expression station by pressing the margin of an open-faced chamber against said septum, introducing a batch of said mixture within said chamber, and applying pressure within said chamber to press said batch against said septum at a pressure of at least 2 MPa for 0.05 to 0.5 second while maintaining a pressure between said margin and said septum at least 0.6 MPa greater than the pressure against said batch to express said liquid through said septum while retaining residual plant solid on said septum, said expressed liquid containing at least 3% by weight of carrageenan.

4. Method as claimed in claim 3 in which said septum is in the form of an endless band and said method comprises the additional step of removing said residual plant solid from said septum after expression of said liquid before reaching said expression station.

* * * * *